June 8, 1965 C. D. NESTLERODE 3,188,573

DUAL MODULATION COMMUNICATION SYSTEM

Filed Dec. 21, 1960

INVENTOR.
CLIFFORD DALE NESTLERODE
BY
OSTROLENK, FABER, GERB & SOFFEN
ATTORNEYS

United States Patent Office 3,188,573

Patented June 8, 1965

3,188,573

DUAL MODULATION COMMUNICATION SYSTEM

Clifford Dale Nestlerode, West Covina, Calif., assignor to Standard Kollsman Industries, Inc., Melrose Park, Ill., a corporation of Illinois Filed Dec. 21, 1960, Ser. No. 79,478
8 Claims. (Cl. 329—135)

This invention relates to a novel system of transmitting two independent information, entertainment, or data bands on a common carrier and simplified circuits for their independent demodulation.

In accordance with the present invention, both amplitude modulation (AM) and frequency modulation (FM) are effected on a carrier signal, and both modulation bands are detected or otherwise fully demodulated into their corresponding original content at a common demodulation circuit. Such system results in economy of transmission channels and equipment as well as receiver circuitry of reduced cost. Common transmitting amplifiers, carrier frequency, antenna or cable network, as well as receiver tuning and amplifier circuitry results.

The present invention is particularly useful in a pay-television installation for a whole community, as described in the copending patent application Serial No. 77,569 filed on December 22, 1960 for Remote Interrogation Decoding Circuitry, and Serial No. 77,384 filed December 21, 1960 for Reply Circuitry for Remote Interrogation System, both being assigned to the assignee of this case. In such systems the carrier, as at 34 megacycles per second, is FM modulated with music and announcements, as well as simultaneously AM modulated with successive coded tone bursts as interrogation signals. The tone signals do not interfere with the audio content, being above audible frequencies. In other applications of the invention, the coded tone signals or other AM modulations may be utilized for triggering an auxiliary circuit or function. For the pay-television systems described in said copending applications, they trigger a reply signal sent back to the central studio for automatic billing purposes.

It is accordingly an object of the present invention to provide a novel system of simultaneous or dual AM and FM modulation of a common carrier signal without interference.

Another object of the present invention is to provide a novel combination music and interrogation code tone signals to pay-television subscribers on a single carrier channel.

A further object of the present invention is to provide a novel demodulation circuit effective for demodulating a dually modulated carrier of FM and AM bands thereof.

Still another object of the present invention is to provide a novel stable demodulator circuit for an FM or an FM and AM modulated carrier, of high quality and relatively low cost.

These and other objects of this invention will become more apparent from the description of an exemplary embodiment thereof, illustrated in the drawing, in which.

Figure 1:
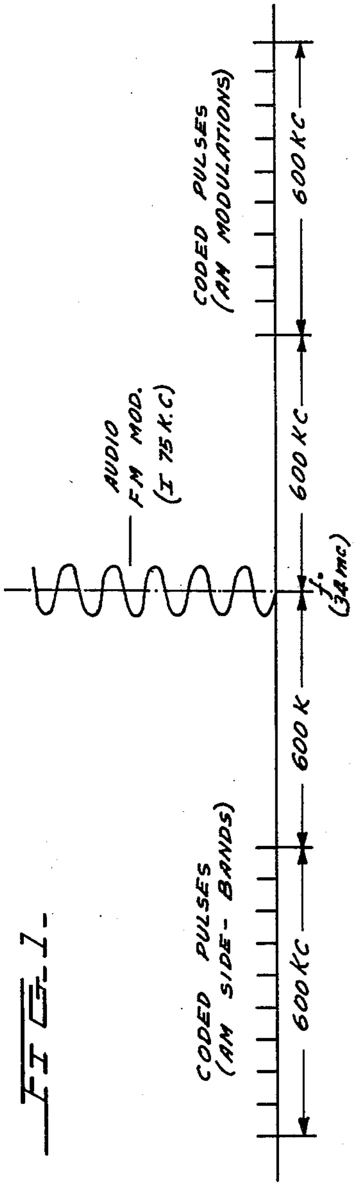
FIGURE 1 is a diagrammatic representation of a carrier frequency simultaneously modulated by both AM and FM signals.
Figure 2:
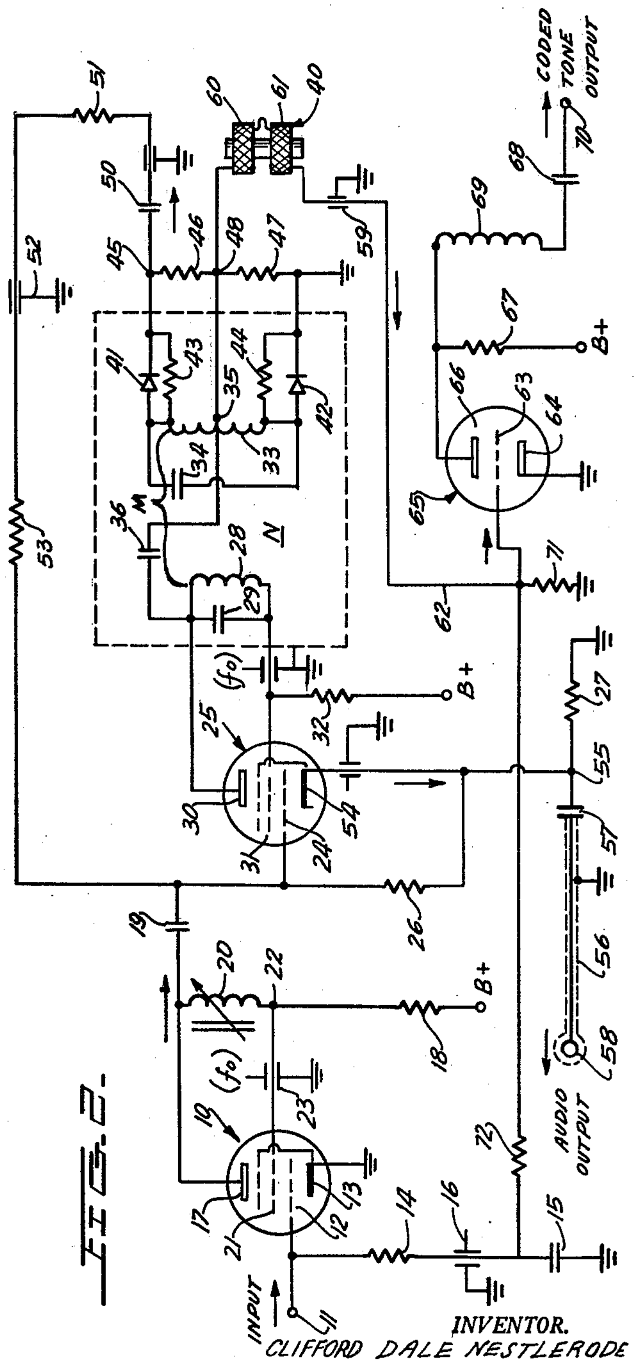
FIGURE 2 is a schematic circuit diagram of the exemplary demodulator.

Referring to FIGURE 1, the basic carrier is indicated at central frequency $f_0$. The frequency modulated sound is typically at ±75 kilocycles deviation for high quality audio rendition. The AM modulation of control or interrogation signals covers the range of 600 to 1200 kilocycles, with two side bands for the "tones." For twenty discrete tones for code selections, each tone would be 31.5 kc. apart in the exemplary 600 kc. band. A suitable carrier ($f_0$) for pay-television is 34 megacycles. Interrogation coded tone bursts of four at one time out of the twenty in the band, can provide for an interrogation system for over 4800 receivers for each reply line. Other tone frequencies, combinations or applications are of course feasible for the invention hereof, including the demodulator circuitry.

The AM-FM modulated carrier ($f_0$) signal is transmitted by conventional means, as broadcast or through coaxial cable, to the subscriber receiver. The signal is conducted to the input terminal 11 of the amplifier stage 10. The input of stage 10 comprises grid electrode 12 and grounded cathode 13, and input resistor 14 in series with capacitor 16 to ground. The anode potential source B+ connects to plate 17 through decoupling resistor 18 and adjustable coil 20. The screen-grid electrode 21 connects to the potential at point 22 through feed-through condenser 23. The output of stage 10, primarily through coil 20, is tuned to the carrier frequency $f_0$, 34 mc. in this example; with circuit parameters to fully pass all possible tone sidebands (through ±1200 kc.).

The thus amplified carrier signals are impressed upon the control grid electrode 24 of driver amplifier stage 25 through coupling condenser 19. A one megohm grid leak resistor 26 connects grid 24 to ground through cathode resistor 27, which is at 470 ohms in the exemplary circuit. Tube 25 is a pentode stage, and may desirably be half of a dual purpose tube as may stage 10. The output of stage 25 comprises a parallel L–C circuit 28, 29 tuned to the carrier frequency signal i.e. at the 34 mc. frequency herein. The plate 30 and screen-grid 31 electrodes are supplied from the potential source B+ through decoupling resistor 32.

The FM discriminator network N includes the tuned L–C unit 28, 29 of stage 25, coupled to L–C circuit 33, 34 resonant at the same frequency as 28, 29; namely at the $f_0$ carrier. Coils 28 and 33 are inductively coupled. The network N hereof embodies the well-known phase-shift discriminator arrangement. The mid-point 35 of secondary winding 33 is coupled to the anode side of primary winding 28 through a blocking condenser 36. Condenser 36 acts as a by-pass to signal frequencies. A diode 41, 42 is in series between each end of the secondary winding 33; and a resistor 43, 44 such as 180,000 ohms, shunts each diode.

At carrier frequency ($f_0$) the phase-detection relation results in equal amplitudes through diode 41, 42; and at frequencies above and below $f_0$ in frequency modulation, a corresponding differential voltage appears at N output terminal 45. The discriminator output at 45 is the demodulated or detected frequency modulations (FM) on the carrier ($f_0$) see FIGURE 1. Two equal resistors 46, 47 are in series between terminal 45 and ground, of individual value as 47,000 ohms, providing a mid-point voltage tap 48 for inductor 40, also used for the AM detection to be described hereinafter.

The detected FM audio band may be conducted from point 45, through coupling condenser 50, directly to an audio amplifier. However, the invention system feeds such output back to the driver stage 25 to effect a cathode follower, low impedance output coupling therefore at negligible further cost. In this manner, a longer shielded cable may be utilized for remotely locating a quality audio amplifier system for FM music from the $f_0$ carrier. Towards this end, an R-C filter 51, 52 is proportioned to serve as an RF filter to prevent RF feedback between the input 24 and output 45. Also, an isolation resistor 53 is inserted in the return path. In the exemplary 34 mc. circuit, resistors 51 and 53 were respectively 1000 and 100,000 ohms; and feed-through condenser 52, 1000 mmfd.

The audio signals from N output terminal 45 fed back to the grid input 24 of driver stage 25 extend to only the order of 20,000 cycles. The cathode 54 serves as a cathode follower, wherein its current is varied by the fed back audio signals, and the cathode resistor 27 develops a signal voltage at its terminal 55 in correspondence with the demodulated FM audio signals. The audio frequency (FM) modulation signals at 55 are conducted along shielded cable 56 across blocking condenser 57 to audio output terminal or jack 58. The output signal from jack 58 is at good quality responsive, and at low impedance to permit shielded cable connection to a remote amplifier and speaker unit with negligible signal deterioration.

The coded tone pulses or bursts, being AM modulated as stated hereinabove (see FIGURE 1), appear in demodulated or detected form across the resistors 46, 47 at the output of the FM discriminator network N. This is due to the individual detectors 41, 42 in back-to-back arrangement. The signals across resistor 47, at point 48, accordingly contain the AM modulated code tones, in the 600 to 1200 kc. range herein. Inductor 40 is proportioned as a peaking coil to boost the upper tone frequencies that otherwise would be deteriorated due to circuit shunting capacities. Also inductor 40 and feed-through capacitor 59 serve as an RF filter to prevent the higher carrier and side band frequencies from passing through.

The exemplary inductor 40 contains two-layer-wound coils 60, 61 universal, pi-wound. Coils 60, 61 are connected in series, and proportioned to total 630 microhenries for the 34 mc. carrier hereof. The pi-wound coil 60 self-resonates at 34 mc. to trap out the carrier and side bands of that order. The AM demodulated tones are conducted by lead 62 from inductor 40 to the input electrode 63 of a triode amplifier stage 65, the cathode 64 of which is grounded. The coils 60, 61 of inductor 40 also serve as peaking coils to level-out the overall response of the AM detected tone signals to grid electrode 63, over the 600–1200 kc. range.

Amplifier stage 65 is the first tone amplifier, ahead of the driver amplifier for the decoder circuitry (not shown) described in the aforesaid patent application Serial No. 77,569. Anode 66 is supplied by the potential source B+ through a load resistor 67, as 10,000 ohms. The output terminal 70 couples to the anode 66 through a blocking condenser 68 and a peaking coil 69. Coil 69 is proportioned to maintain level response for the twenty discrete tones. Each successive tone burst contains say four distinct tones, and the output terminal 70 is the demodulated interrogation code signals for the decoder. The negative D.C. component which appears across demodulator load resistor 47 is connected through coil 40 to the grid of tone amplifier 65 and through R-C filter 72 and 15 to the grid return of input stage 10 to obtain an A.G.C. (automatic gain control) action to maintain coded tone output level relatively constant with changing 34 mc. carrier input level.

To obtain an independent additional sound channel for use with intercarrier TV receivers, a second sound carrier is added on the opposite side of the picture carrier of a program channel. By doing this, the picture carrier of an existing channel can be used to obtain the 4.5 mc. differential necessary with intercarrier receivers. By choosing the band-pass in such a manner, no picture will be received since the video information is mainly transmitted outside the receiver band-pass.

Although the present invention has been described in connection with an exemplary form and application, modifications and variations in its circuitry and use may be practiced within the broader spirit and scope thereof as defined in the following claims.

I claim:

1. A demodulator circuit for a simultaneous frequency modulated and amplitude modulated carrier signal with independent bands about a central carrier frequency comprising an input amplifier stage having an output tuned to the carrier frequency, a discriminator containing a circuit resonant at the carrier frequency coupled to the output of said amplifier stage and a pair of diodes circuit connected within the discriminator for demodulating the frequency modulated band of the carrier signal, circuit means connected across said diodes to establish an audio response at a first terminal thereof corresponding to the frequency modulated band, said pair of diodes further serving as detector means for detecting the amplitude modulated signal in said carrier signal simultaneously with detection of said frequency modulated signal to provide said detected amplitude modulated signal at a second terminal of said discriminator, means including carrier frequency filter means circuit connected between said circuit means and the input of said amplifier stage for applying the audio signals thereto, an impedance in the amplifier circuit for establishing a low impedance output signal corresponding to said audio response, and second circuit means for coupling said detected amplitude modulated signal to corresponding output means, said amplifier stage providing both amplification of said simultaneously modulated amplitude modulated and frequency modulated signals to said discriminator and said low impedance output amplification of said detected audio signal.

2. A dual demodulator circuit for a simultaneous frequency modulated and amplitude modulated carrier signal with independent bands about a central carrier frequency comprising an input amplifier stage having an output tuned to the carrier frequency, a phase-shift discriminator containing a first and second tuned circuit, each resonant at the carrier frequency coupled to the output of said amplifier stage and a pair of diodes circuit connected for demodulating the frequency modulated band of the carrier signal, first circuit means including two resistors in series connection and connected across said diodes to establish an audio response corresponding to the frequency modulated band, at an end terminal of one of said resistors, and means including circuit connections between said circuit resistors and the input of said amplifier stage for applying the audio response thereto, and a cathode resistor in the amplifier circuit for establishing a low impedance output signal corresponding to said audio response, said pair of diodes further serving as detector means for detecting the amplitude modulated signal in said carrier signal simultaneously with detection of said frequency modulated signal, the midpoint of said two resistors providing the output of said detected amplitude modulated signal, and second circuit means for coupling said detected amplitude modulated signal to corresponding output means, said amplifier stage providing both amplification of said simultaneously modulated amplitude modulated and frequency modulated signals to said discriminator and a low impedance output across said cathode resistor for amplification of said detected audio output.

3. A dual demodulator circuit for a simultaneous frequency modulated and amplitude modulated carrier signal with independent bands about a central carrier frequency comprising a phase-shift discriminator containing a double-tuned circuit resonant at the carrier frequency and a pair of diodes circuit connected for demodulating the frequency modulated band of the carrier signal, circuit means including two resistors in series connection and connected across said diodes to establish an audio response corresponding to the frequency modulated band, at an end terminal of one of said resistors, said pair of diodes further serving as detector means for detecting the amplitude modulated signal in said carrier signal simultaneously with detection of said frequency modulated signal, the midpoint of said two resistors providing the output of said detected amplitude modulated signal, and second circuit means for coupling said detected amplitude modulated signal to corresponding output means, said circuit means including an inductor connected to the midpoint between said circuit resistors for conducting demodulated amplitude modulated signals and trapping the carrier frequency signals, and amplifier means in circuit with said inductor for establishing an output for the amplitude modulated band.

4. A demodulator circuit as claimed in claim 2, further including an inductor connected to the midpoint between said circuit resistors for conducting demodulated amplitude modulated signals and trapping the carrier frequency signals, and amplifier means in circuit with said inductor for establishing an output for the amplitude modulated band.

5. A demodulator circuit as claimed in claim 4, in which said inductor is proportioned to trap out carrier frequency signals between the discriminator output and said amplifier means, said inductor being formed with layer windings self-resonant to the trapping frequency.

6. A demodulator circuit as claimed in claim 4, in which said means includes a filter network proportioned for isolating carrier frequency signals from the discriminator output to the amplifier stage input, said inductor is proportioned to trap out carrier frequency signals between the discriminator output and said amplifier means, said inductor being formed with layer windings self-resonant to the trapping frequency.

7. A demodulator circuit as claimed in claim 2, in which said first circuit means includes a filter network proportioned for isolating carrier frequency signals from the discriminator output to the amplifier stage input.

8. A demodulator circuit as claimed in claim 3, in which said inductor is proportioned to trap out carrier frequency signals between the discriminator output and said amplifier means.

References Cited by the Examiner

UNITED STATES PATENTS

| | | | |
|---|---|---|---|
| 2,357,932 | 9/44 | Crosby | 329—135 |
| 2,382,014 | 8/45 | Lange | 329—135 |
| 2,382,015 | 8/45 | Lange | 329—135 |
| 3,059,056 | 10/62 | Freedman et al. | 179—15 |

ROY LAKE, *Primary Examiner.*

L. MILLER ANDRUS, ALFRED L. BRODY, NATHAN KAUFMAN, *Examiners.*